(12) United States Patent
Chopade et al.

(10) Patent No.: US 10,202,541 B2
(45) Date of Patent: Feb. 12, 2019

(54) FRACTURING FLUID AND METHOD OF USE

(71) Applicant: HALLIBURTON ENERGY SERVICES, INC., Houston, TX (US)

(72) Inventors: Prashant D. Chopade, Kingwood, TX (US); Dipti Singh, Kingwood, TX (US); Ali Alwattari, The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/503,504

(22) PCT Filed: Aug. 28, 2014

(86) PCT No.: PCT/US2014/053089
§ 371 (c)(1),
(2) Date: Feb. 13, 2017

(87) PCT Pub. No.: WO2016/032474
PCT Pub. Date: Mar. 3, 2016

(65) Prior Publication Data
US 2017/0233640 A1     Aug. 17, 2017

(51) Int. Cl.
| | | |
|---|---|---|
| C09K 8/68 | (2006.01) | |
| C09K 8/88 | (2006.01) | |
| C09K 8/90 | (2006.01) | |
| C09K 8/80 | (2006.01) | |
| E21B 43/26 | (2006.01) | |
| E21B 43/267 | (2006.01) | |

(52) U.S. Cl.
CPC ............ *C09K 8/685* (2013.01); *C09K 8/80* (2013.01); *C09K 8/887* (2013.01); *C09K 8/90* (2013.01); *E21B 43/26* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 3,958,581 A | 5/1976 | Abegg et al. | |
| 4,463,810 A | 8/1984 | Hill | |
| 4,488,975 A | 12/1984 | Almond | |
| 5,866,110 A | 2/1999 | Moore et al. | |

(Continued)

FOREIGN PATENT DOCUMENTS

| | | |
|---|---|---|
| CA | 2630033 C | 8/2013 |
| EP | 0197684 B1 | 12/1990 |

(Continued)

OTHER PUBLICATIONS

Celquat SC-230M, National Starch & Chemical, retrieved Jun. 11, 2018 from https://www.mahachem.com/wp-content/uploads/2014/12/16.-Celquat-SC230M.pdf (Year: 2018).*

(Continued)

*Primary Examiner* — Angela M DiTrani Leff
(74) *Attorney, Agent, or Firm* — Polsinelli PC

(57) ABSTRACT

The disclosure describes aqueous fracking fluid comprising crosslinked cationic cellulose, methods for preparing the aqueous fracking fluid, and methods of using the aqueous fracking fluid.

12 Claims, 4 Drawing Sheets

(56) References Cited

U.S. PATENT DOCUMENTS

| | | | |
|---|---|---|---|
| 6,810,959 B1* | 11/2004 | Qu | C09K 8/68 |
| | | | 166/300 |
| 8,710,363 B2 | 4/2014 | Fujiwara | |
| 2004/0209780 A1 | 10/2004 | Harris et al. | |
| 2008/0139411 A1 | 6/2008 | Harris et al. | |
| 2011/0143970 A1 | 6/2011 | Rieb et al. | |
| 2011/0256085 A1 | 10/2011 | Talingting Pabalan et al. | |
| 2014/0066340 A1* | 3/2014 | Hoff | C09K 8/035 |
| | | | 507/114 |

FOREIGN PATENT DOCUMENTS

| | | |
|---|---|---|
| EP | 1443089 A1 | 8/2004 |
| WO | 0148021 A1 | 7/2001 |

OTHER PUBLICATIONS

International Search Report and Written Opinion; PCT Application No. PCT/US2014/053089; dated Apr. 28, 2015.

* cited by examiner

FRACTURING FLUID AND METHOD OF USE

CROSS-REFERENCE TO RELATED APPLICATIONS

This application is a national stage entry of PCT/US2014/053089 filed Aug. 28, 2014, said application is expressly incorporated herein in its entirety.

FIELD

The present disclosure relates generally to an aqueous fracturing fluid comprising crosslinked cationic cellulose, methods of making the fracturing fluid, and methods of using the fracturing fluid.

BACKGROUND

Hydraulic fracturing operations are often carried out on oil and gas wells to increase the flow of oil and natural gas from the wells. The fracturing fluid creates fractures in the formation and transports and deposits proppants into the fractures. The proppants hold the fractures open after the fracturing fluid flows back into the well. To adequately propagate fractures in subterranean formations, the fracturing fluid should exhibit minimal fluid loss into the formation and should have sufficient viscosity to carry large volumes of proppant into the cracks in the formation formed during fracturing. The fracturing fluid, however, should also readily flow back into the well after the fracturing operation is complete, without leaving residues that impair permeability and conductivity of the formation.

In order to increase the viscosity of fracturing fluids, hydratable high molecular weight polymers such as Guar, polysaccharides, polyacrylamides and polyacrylamide copolymers are sometimes used. The viscosity of the fracturing fluid can be further increased by adding crosslinking compounds to the fluids. The term "crosslink" is used herein to refer to "an attachment of two chains of polymer molecules by bridges, composed of either an element, a group, or a compound that joins certain atoms of the chains by association." Conventional crosslinking agents such as polyvalent metal ions or borate ions form chemical bonds between the viscosifier polymer molecules which raise the viscosity of the solution. In order to allow the crosslinked fluid to flow back out of the formation and into the well, a breaker is sometimes added to the fracturing fluid to degrade the molecular weight and thereby reduce the viscosity of the fracturing fluid.

Viscoelastic surfactants have also been added to fracturing fluids to increase their viscosity. For example, gels can be formed by the association of hydrophobic portions of surfactants to form micelles or larger associative structures. The micelles or other associative structures increase the viscosity of the base fluid. A "micelle" is as "a colloidal particle composed of aggregates of surfactant molecules."

During the fracturing operation, the polymers and other compounds used to increase the viscosity of the fracturing fluid form a film over the fracture matrix, referred to as a "filtercake." The filtercake prevents excessive fluid leakage into or out of the formation. After the fracturing operation is complete, however, as much of the filtercake as possible is removed. Otherwise, the filtercake will impede the flow of oil and gas into the well bore. In particular, filtercakes deposited from conventional fracturing fluids can be difficult to remove and significantly interfere with oil and gas production.

Guar in particular is a commonly used polymer in fracking fluids. Upon degradation, however, Guar tends to form water insoluble particles that create residues that can significantly impede recovery of hydrocarbons from the well. The water insoluble particles are believed to remain in the formation and cause plugging that impairs the permeability of sand or gravel packs.

BRIEF DESCRIPTION OF THE DRAWINGS

Implementations of the present technology will now be described, by way of example only, with reference to the attached figures, wherein.

Figure 1:
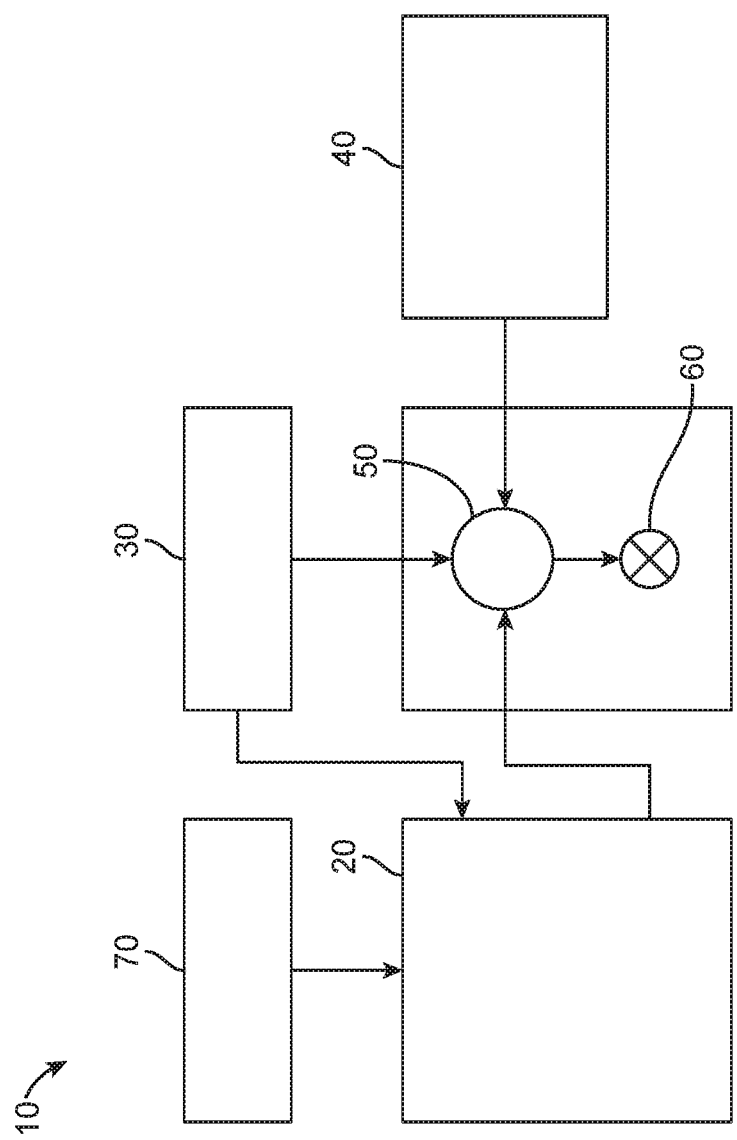
FIG. 1 is a diagram illustrating an example of a fracturing system that may be used in association with certain embodiments of the present disclosure.

It should be understood that the various embodiments are not limited to the arrangements and instrumentality shown in the drawings.

DETAILED DESCRIPTION

Cellulose has had limited use in many petroleum applications because some types of cellulose are not easily cross-linked. The present application, however, discloses methods for producing crosslinked, cellulose-based fracturing fluids. In particular, the present disclosure relates to cellulose-based fracturing fluids having a cationic cellulose crosslinked to impart viscosity. The fracturing fluids of the present disclosure are particularly useful and have properties differentiated to traditional fracturing fluids, such as guar-based fracturing fluids, in that the fracturing fluids of the present disclosure:

Have a very stable crosslink viscosity;
Exhibit an increased temperature stability;
Provide enhanced proppant suspension;
Improved conductivity retention; and
Are clean and environmentally safe.

These unique properties make the fracturing fluids of the present disclosure extremely effective in improving extraction and yield of hydrocarbons from subterranean wells. Furthermore, these properties allow the fracturing fluids to be used over a wider range of well and subsurface conditions (e.g., types of water, weather, etc.). Finally, the properties of the fracturing fluid can be easily modulated by varying gel loading, crosslinker loading, pH, and with the use of various additives.

Cationic Celluloses

The term "cationic cellulose" refers to a cationic product obtained by allowing a derivatizing agent to react with OH groups of a cellulose or a derivative thereof. Examples of cellulose to be derivatized include: cellulose; alkylcellulose such as methylcellulose, or ethylcellulose; hydroxy alkylcellulose such as hydroxy methylcellulose, hydroxy ethylcellulose, or hydroxy propylcellulose; and hydroxy alkylalkylcellulose, in which an OH group of cellulose has been substituted with an alkoxy group or a hydroxy alkoxy group, such as hydroxy ethylmethylcellulose, hydroxy propylmethylcellulose, or hydroxy ethylethylcellulose. Of these, hydroxy alkylcellulose such as hydroxy ethylcellulose is often used.

As a derivatizing agent, a substance having a group that reacts with an OH group of cellulose or a derivative thereof and a cation portion of a quaternary ammonium group or the like can be used. A group that reacts with an OH group is not particularly limited as long as it is a reaction group that forms a covalent bond with an OH group. Examples thereof include an epoxy group, a halohydrin group, a halogen group, a vinyl group, and a methylol group. In view of reactivity, an epoxy group and a halohydrin group are particularly useful. In addition, a quaternary ammonium group has a —$N^+R_3$ structure (where R represents an alkyl group (e.g., from 1-18 carbon atoms, an aryl group, or a heterocyclic group, each which may optionally be substited). Examples of derivatizing agents include glycidyltrialkyl ammonium halide such as glycidyltrimethyl ammonium chloride or 3-chloro-2-hydroxy propyltrimethyl ammonium chloride, and a halohydrin form thereof.

For example, a cationic cellulose can be obtained by reacting hydroxy ethylcellulose and 3-chloro-2-hydroxy propyltrimethyl ammonium chloride used as a derivatizing agent. In the case of such cationic cellulose, hydrogen atoms of three OH groups of cellulose are partially substituted with a hydroxy ethyl group (—$CH_2CH_2OH$). The degree of substitution (substitution degree: m) is 1 to 3 (that is to say, 1 to 3 OH groups in a cellulose repeat unit are substituted), and in some instances is approximately 1.3.

In addition, the rate of derivatizing induced by a derivatizing agent (that is to say, the percentage of —$CH_2CH_2OH$ groups cationized with a quaternary ammonium salt among the all —$CH_2CH_2OH$ groups of hydroxyethylcellulose in the above cationic cellulose derivative) can vary depending on the molecular weight of cellulose, the amount/type of redox pair, and the like, and it is not particularly limited. However, it may be 20% to 50% or 30% to 40%. Similarly, the degree of substitution (m) and the percentage of —$CH_2CH_2OH$ groups to be cationized also can apply to other cationic cellulose derivatives, in addition to the above cationized hydroxyethylcellulose.

The cationic cellulose of the present disclosure is typically water-soluble. As used herein, the term "water-soluble" means that at least 1 gram of the cationic cellulose is soluble in 100 grams of distilled water at 25° C. and 1 atmosphere. The extent of water solubility is control by the level of substituent groups, including the cationic groups, attached to the cellulose derivative. Techniques for varying the water solubility of cellulose are known to those skilled in the art.

Typically, the cationic substituents suitable for use comprise nitrogen. For example, the cationic substituents may be selected from the group consisting of alkyl substituted nitrogen compounds, aryl substituted nitrogen compounds or alkyl-aryl substituted nitrogen compounds. Often, the derivatizing reagents used to provide the cationic substituents are alkyl substituted nitrogen halides such as, for example, (2,3-Epxoypropyl) trimethyl ammonium chloride available as a 70 wt % solids solution from Degussa Corporation as QUAB™ 151.

In some embodiments, the cationic substituents suitable for use in accordance with the present disclosure have the formula:

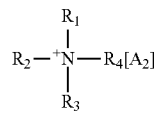

Formula (I)

wherein each $R_1$, $R_2$, and $R_3$ are independently H, $CH_3$ or $C_2H_5$;
$R_4$ is $CH_2CHOHCH_2$ or $CH_2CH_2$; and
$A_2$ is a halide ion.

In some embodiments, the cationic substituents suitable for use in accordance with the present disclosure relate to formula (I), wherein
$R_1$, $R_2$, and $R_3$ are $CH_3$;
$R_4$ is $CH_2CHOHCH_2$; and
$A_2$ is chlorine.

In other embodiments, $R_1$, $R_2$, or $R_3$ are independently an alkyl or arylalkyl group having 8 to 18 carbon atoms.

In most cases, the substitution level of the cationic substituents on the cellulose ranges from about 3.0 to 8.0 wt. % of the cationic substituent, e.g., cationic nitrogen based on the total weight of the cellulose. In one embodiment, the percent cationic nitrogen for the cationic cellulose of the present disclosure is from about 3.0 to 6.0 wt %. In another embodiment, the percent cationic substituent is from about 3.0 to 5.0 wt %. As used herein, percent cationic substituent is the percentage of cationic substituent covalently bound to the anhydroglucose monomers of the cellulose. The substitution level can be determined by a number of different methods known to those skilled in the art. For example, one method for determining percent cationic nitrogen is the Kjeldahl method as disclosed in Organic Analysis, volume III. [Interscience Publishers, New York], pp., 136-141. Determining the amount of covalently bound nitrogen can be accomplished, for example, by dialyzing the derivatized polymer against distilled water using dialysis membranes such as those supplied by the Spectrum company, Houston, Tex. Dialysis allows for the removal of the unreacted, low molecular weight nitrogen containing species and provides derivatives which contain only nitrogen reacted to the polymer. In addition, the level of covalent cationic substituent can be determined by nuclear magnetic resonance spectroscopy (NMR), the use of which is known to those skilled in the art.

The cationic cellulose of the present disclosure can be prepared by: (i) reacting a cellulose with a first aqueous derivatizing reagent to form a first reaction product comprising a first cationic cellulose and water; (ii) removing at least a portion of the water from the first reaction product, e.g., by centrifuging, to form a dried reaction product comprising the first cationic cellulose; and (iii) reacting the dried reaction product with a second aqueous derivatizing reagent to form a second reaction product comprising a second cationic cellulose having a higher substitution level of cationic substituent than the first cationic cellulose. The first cationic cellulose may have a substitution level of less than about 2.5 wt, % of the cationic substituent based on the total weight of the cellulose. The first derivatizing agent and the second derivatizing agent can be the same or different. Furthermore, the cationic cellulose of the present disclosure may be formed in a sequential series of reaction steps.

Many types of cationic cellulose are commercially available and useable for purposes of the present disclosure, such as: UCARE® Polymer JR-400-cationic hydroxyethyl cellulose has a molecular weight of approximately 400,000, and is derivatized with approximately 1.8 percent cationic nitrogen (available from Amerchol Corporation, Edison, N.J.). UCARE® Polymer LK-400-cationic hydroxyethyl cellulose has a molecular weight of approximately 400,000, and is derivatized with approximately 0.5 percent cationic nitrogen (available from Amerchol Corporation). UCARE® Polymer LR-400-cationic hydroxyethyl cellulose has a molecular weight of approximately 400,000, and is derivatized with approximately 1.0 percent cationic nitrogen (available from Amerchol Corporation). UCARE® Polymer JR-30M-cationic hydroxyethylcellulose has a molecular weight of approximately 900,000, and is derivatized with 1.8-2.2 percent cationic nitrogen (available from Amerchol Corporation). QUAB® 151-Glvcidyltrimethylammonium chloride is available as a 70% aqueous solution (available from Degussa, Ridgefield Park, N.J.).

Crosslinkers

The term "crosslink" is used herein to refer to "an attachment of two chains of polymer molecules by bridges, composed of either an element, a group, or a compound that joins certain atoms of the chains by association." Conventional crosslinking agents useful in the present disclosure include polyvalent metal ions or borate ions. Typically, the crosslinking agent reacts with the hydroxyl groups of the cationic cellulose.

In one embodiment the crosslinking agent is selected from the group consisting a borate ion, a magnesium ion, a zirconium IV ion, a titanium IV ion, an aluminum ion, an antimony ion, a chromium ion, an iron ion, a copper ion, a magnesium ion, a zinc ion, any compound capable of producing one or more of these ions, and any combination thereof. More specific examples include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. Commercially available cross-linking agents include Halliburton's CL-11™ and CL-18™ crosslinking agents, which are titanium-triethanolamine crosslinkers.

In one embodiment the crosslinking agent comprises titanium. For example, the crosslinking agent may include titanium-triethanolamine. In another embodiment, the cross-linking agent comprises one or more metals selected from the group consisting of titanium (Ti), aluminium (Al), zirconium (Zr), and chromium (Cr).

Furthermore, in certain instances, a delay in crosslinking may be advantageous. For example, a delayed crosslinker can be placed downhole prior to crosslinking; the gel fluid is prepared on the surface, then crosslinks after being introduced into a wellbore which penetrates a subterranean formation, forming a high viscosity treating fluid therein. The delay in crosslinking is beneficial in that the amount of energy required to pump the fluids can be reduced, the penetration of certain fluids can be improved, and shear and friction damage to polymers can be reduced. By delaying crosslinking, crosslinkers can be more thoroughly mixed with the polymer fluid prior to crosslink initiation, providing more effective crosslinks, more uniform distribution of crosslinks, and better gel properties.

Proppants

The fracturing fluid further comprises a proppant. In general, proppants must have sufficient compressive strength to resist crushing, but also be sufficiently non-abrasive and non-angular to preclude cutting and embedding into the formation. Suitable proppant material includes but is not limited to, sand, graded gravel, glass beads, sintered bauxite, resin-coated sand, ceramics, and intermediate-strength ceramics. Proppants are often present in the fracturing fluid composition in an amount in the range of from about 0.5 lb/gal to about 24 lb/gal thereof, or from about 1 lb/gal to about 12 lb/gal.

When using proppant, after a specified amount of proppant is deposited into the formation, the wellbore is shut in by closing a valve at the surface for a period of time sufficient to permit stabilization of the subterranean formation. Contact with formation fluids such as oil and brine breaks the micellar bonds of the fracturing fluid thereby reducing the viscosity and allowing it to be recovered from the subterranean formation. Chemical breakers may also be included to degrade the polymer backbone thereby lowering the viscosity of the fracturing fluid composition. Following the reduction in viscosity, the fracturing fluid composition flows out of the fracture leaving the proppant material, when present, behind to hold the fractures open. Since conventional polyvalent metal and borate ion crosslinking agents are not required, filter cake on the walls of the well bore is more easily removed, providing for improved well performance.

pH Adjusting Agents

The fracturing fluids of the present disclosure also may comprise a pH adjusting agent. The pH adjusting agents may be included in the fracturing fluid to facilitate the formation of the crosslinked fracturing fluid (or for the delinking of crosslinks for breading down the fluid). In some embodiments, the cationic cellulose may not be capable of forming crosslinks between in acidic environments at or below a pH 6.0, 7.0, 7.5, or 8. Therefore, crosslinking or delinking may occur by adjusting the pH of the fluid once it is placed in a desired location, e.g., in a subterranean well bore, or at the end of a subterranean operation. In certain embodiments in which the pH is to be increased (e.g., to facilitate crosslinking), suitable pH adjusting agents may comprise a base. Examples of suitable bases include, but are not limited to, sodium hydroxide, potassium hydroxide, lithium hydroxide, sodium carbonate, potassium carbonate, ammonium hydroxide or a combination thereof. Typically, an appropriate pH for forming and maintaining the crosslinked fracturing fluid of the present disclosure is at least 7, or ranges from about 7 to about 12, about 7.5 to about 10, or about 8 to about 10.

In other embodiments in which the pH is to be decreased (e.g., to facilitate delinking crosslinks), suitable pH adjusting agents comprise an acid. For example, the acid may be fumaric acid, formic acid, acetic acid, acetic anhydride, hydrochloric acid, hydrofluoric acid, hydroxyfluoroboric acid, polyaspartic acid, polysuccinimide, or a combination thereof. The appropriate pH adjusting agent and amount used may depend on the formation characteristics and conditions, on the breaking or crosslinking time desired, on the nature of the cationic cellulose, and on other factors known to individuals skilled in the art with the benefit of this disclosure.

The fracturing fluids of the present disclosure may further comprise a buffer. Buffers may be used to maintain a treatment fluid's pH in a limited range. Examples of suitable buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, and the like. When used, the buffer may be included in an amount sufficient to maintain the pH of such viscosified treatment fluids at a desired level. In an embodiment, a buffer may be included in an amount of from about 0.5% to about 10% by weight of the fracturing fluid. One of ordinary skill in the art, with the benefit of this disclosure, will recognize the appropriate buffer and amount of the buffer to use for a chosen application.

Viscosity Enhancing Agents

A viscosity-enhancing agent may optionally be added to the fracturing fluid composition. The viscosity-enhancing agent is capable of enhancing the formation of micellar bonds between hydrophobic groups on the polymer and/or between the hydrophobic groups on adjacent polymer molecules. Suitable viscosity-enhancing agents include, but are not limited to, fatty alcohols, ethoxylated fatty alcohols and amine oxides having hydrophobic chain lengths of 6 to 22 carbon atoms, and mixtures thereof. In certain embodiment, the viscosity-enhancing agent is present in the fracturing fluid composition in an amount in the range of from about 0.05% to about 1.0% thereof, or from about 0.1% to about 0.6%.

Certain viscosity-enhancing agents are capable of enhancing the formation of micellar bonds between hydrophobic groups on the polymer and/or between hydrophobic groups on adjacent polymer molecules. When added to the treating fluid composition, these agents further increase the viscosity of the composition. Suitable viscosity-enhancing agents include, but are not limited to, fatty alcohols, ethoxylated fatty alcohols, and amine oxides having hydrophobic chain lengths of 6 to 22 carbon atoms, and mixtures thereof. The viscosity-enhancing agent may increase the viscosity of the composition above that attainable by the polymer and surfactant alone. The viscosity-enhancing agent may also make the composition less sensitive to phase separation. When included in the treating fluid composition, the viscosity-enhancing agent is often present in an amount ranging from about 0.05% to about 1.0% thereof, or from about 0.1% to about 0.6%.

Additional Materials

The fracturing fluid of the present application may also include additional constituents or material. One additional material that may be included is a breaker. The purpose of this material is to "break" or diminish the viscosity of the crosslinked fluid so that this fluid is more easily recovered from the formation during cleanup. The breaker degrades the crosslinked polymer to reduce its molecular weight. For example, the breaker may be a peroxide with oxygen-oxygen single bonds in the molecular structure. These peroxide breakers may be hydrogen peroxide or other material such as a metal peroxide that provides peroxide or hydrogen peroxide for reaction in solution. A peroxide breaker may be a so-called stabilized peroxide breaker in which hydrogen peroxide is bound or inhibited by another compound or molecule(s) prior to its addition to water but is released into solution when added to water.

Examples of suitable stabilized peroxide breakers include the adducts of hydrogen peroxide with other molecules, and may include carbamide peroxide or urea peroxide ($CH_4N_2OH_2O_2$), percarbonates, such as sodium percarbonate ($2Na_2CO_3H_2O_2$), potassium percarbonate and ammonium percarbonate. The stabilized peroxide breakers may also include those compounds that undergo hydrolysis in water to release hydrogen peroxide, such sodium perborate. A stabilized peroxide breaker may be an encapsulated peroxide. The encapsulation material may be a polymer that can degrade over a period of time to release the breaker and may be chosen depending on the release rate desired. Degradation of the polymer can occur, for example, by hydrolysis, solvolysis, melting, or other mechanisms. The polymers may be selected from homopolymers and copolymers of glycolate and lactate, polycarbonates, polyanhydrides, polyorthoesters, and polyphosphacenes. The encapsulated peroxides may be encapsulated hydrogen peroxide, encapsulated metal peroxides, such as sodium peroxide, calcium peroxide, zinc peroxide, etc. or any of the peroxides described herein that are encapsulated in an appropriate material to inhibit or reduce reaction of the peroxide prior to its addition to water.

The peroxide breaker, stabilized or unstabilized, is used in an amount sufficient to break the cross-linking. Lower temperatures may require greater amounts of the breaker. In many, if not most applications, the peroxide breaker may be used in an amount of from about 0.001% to about 20% by weight of the treatment fluid, more particularly from about 0.005% to about 5% by weight of the treatment fluid, and more particularly from about 0.01% to about 2% by weight of the treatment fluid.

Additional examples of breakers include: ammonium, sodium or potassium persulfate; sodium peroxide; sodium chlorite; sodium, lithium or calcium hypochlorite; bromates; perborates; permanganates; chlorinated lime; potassium perphosphate; magnesium monoperoxyphthalate hexahydrate; and a number of organic chlorine derivatives such as N,N'-dichlorodimethylhydantoin and N-chlorocyanuric acid and/or salts thereof. The specific breaker employed may depend on the temperature to which the fracturing fluid is subjected. At temperatures ranging from about 50° C. to about 95° C., an inorganic breaker or oxidizing agent, such as, for example, $KBrO_3$, and other similar materials, such as $KClO_3$, $KIO_3$, perborates, persulfates, permanganates (for example, ammonium persulfate, sodium persulfate, and potassium persulfate) and the like, are used to control degradation of the fracturing fluid. At about 90 to 95° C. and above, typical breakers such sodium bromate, may be used.

Breaking aids or catalysts may be used with the peroxide breaker. The breaker aid may be an iron-containing breaking aid that acts as a catalyst. The iron catalyst is a ferrous iron (II) compound. Examples of suitable iron (II) compounds include, but are not limited to, iron (II) sulfate and its hydrates (such as, for example, ferrous sulfate heptahydrate), iron (II) chloride, and iron (II) gluconate. Iron powder in combination with a pH adjusting agent that provides an acidic pH may also be used. Other transition metal ions can also be used as the breaking aid or catalyst, such as manganese (Mn).

Some fluids according to the present disclosure may also include a surfactant. Any surfactant for which its ability to aid the dispersion and/or stabilization of the fracturing fluid may be used.

In some embodiments, the surfactant may be an ionic surfactant. Examples of suitable ionic surfactants include anionic surfactants such as alkyl carboxylates, alkyl ether carboxylates, alkyl sulfates, alkyl ether sulfates, alkyl sulfonates, .alpha.-olefin sulfonates, alkyl ether sulfates, alkyl phosphates and alkyl ether phosphates. Examples of suitable ionic surfactants also include cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include surfactants that are usually regarded as zwitterionic surfactants, and in some cases as amphoteric surfactants, such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments, the surfactant is a cationic, zwitterionic or amphoteric surfactant containing and amine group or a quaternary ammonium group in its chemical structure ("amine functional surfactant"). In other embodiments, the surfactant may be a blend of two or more of the surfactants described above, or a blend of any of the surfactant or surfactants described above with one or more nonionic surfactants. Examples of suitable nonionic surfactants include alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in the wellbore fluid. These fluids may incorporate the surfactant or blend of surfactants in an amount of about 0.02 wt % to about 5 wt % of total liquid phase weight, or from about 0.05 wt % to about 2 wt % of total liquid phase weight.

Other materials which may be included in a wellbore fluid include electrolyte, such as an organic or inorganic salt, friction reducers to assist flow when pumping.

A fracturing fluid may be formed by injecting gas (most commonly nitrogen, carbon dioxide or mixture of them) into fracturing fluid or into the wellbore concomitantly with the fracturing fluid. Dispersion of the gas into the fluid in the form of bubbles increases the viscosity of the fluid and can positively influence its performance, particularly its ability to effectively induce hydraulic fracturing of the formation, and capacity to carry solids. The presence of the gas also enhances the flowback of the fluid when this is required.

Illustrations

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Figure 2:
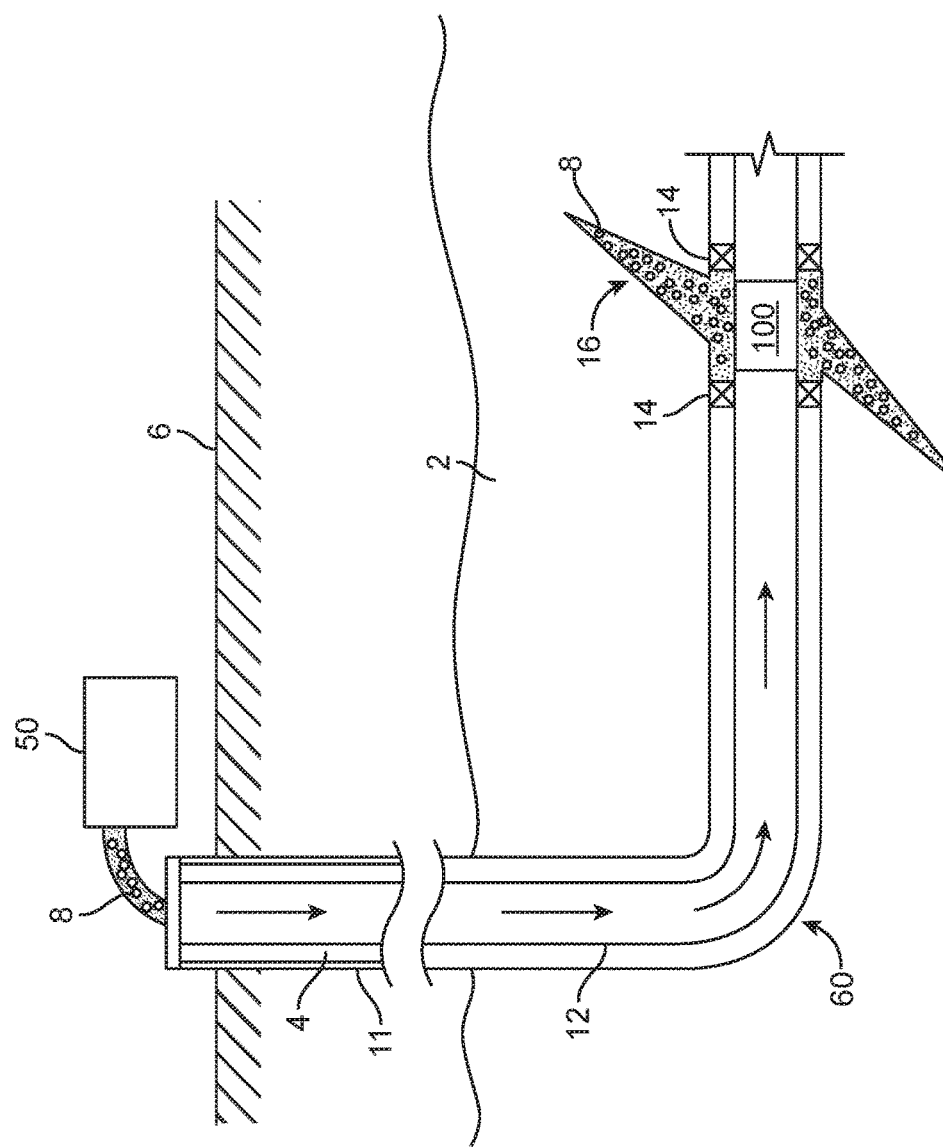
FIG. 2 is a diagram illustrating an example of a subterranean formation in which a fracturing operation may be performed in association with certain embodiments of the present disclosure.

The exemplary methods and compositions disclosed herein may directly or indirectly affect one or more components or pieces of equipment associated with the preparation, delivery, recapture, recycling, reuse, and/or disposal of the disclosed compositions. For instance, an exemplary fracturing system is illustrated in FIGS. 1 and 2. In this example, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used in fracturing the formation, for example, by being pumped through a work string 12 and a multi-acting downhole tool 100 (see FIG. 2) when in the open configuration. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 and out through the multi-acting downhole tool 100 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids using continuous mixing or "on-the-fly" methods. Thus, for example, the pumping and blender system 50 can distribute fracturing fluid and/or proppant through the multi-acting downhole tool 100 to the target subterranean zone.

FIG. 2 illustrates a well 60 performing a fracturing operation in a portion of a subterranean formation of interest 2 surrounding a well bore 4. The well bore 4 extends from the surface 6, and the fracturing fluid 8 is applied to a portion of the subterranean formation 2 surrounding the horizontal portion of the well bore through, for example, the multi-acting downhole tool 100. The tool 100 can include ports, holes, or a sleeve which permits exit of fluid from the work string 12. Although shown as vertical deviating to horizontal, the well bore 4 may include horizontal, vertical, slant, curved, and other types of well bore geometries and orientations, and the fracturing treatment may be applied to a subterranean zone surrounding any portion of the well bore. The well bore 4 can include a casing 11 that is cemented or otherwise secured to the well bore wall. The well bore 4 can be uncased or include uncased sections. In cased wells, perforations can be formed using shape charges, a perforating gun, hydro-jetting and/or other tools.

The well is shown with a work string 12 depending from the surface 6 into the well bore 4. The pump and blender system 50 is coupled to the work string 12 to pump the fracturing fluid 8 into the well bore 4. The working string 12 may include coiled tubing, jointed pipe, and/or other structures that allow fluid to flow into the well bore 4. The working string 12 can include flow control devices that control the flow of fluid from the interior of the working string 12 into the subterranean zone 2.

The working string 12 and/or the well bore 4 may include one or more sets of packers 14 that seal the annulus between the working string 12 and well bore 4 to define an interval of the well bore 4 into which the fracturing fluid 8 will be pumped. FIG. 2 shows two packers 14, one defining an uphole boundary of the interval and one defining the downhole end of the interval. When the fracturing fluid 8 is introduced into well bore 4 at a sufficient hydraulic pressure, one or more fractures 16 may be created in the subterranean zone 2. The proppant particulates in the fracturing fluid 8 may enter the fractures 16 where they may remain after the fracturing fluid flows out of the well bore. These proppant particulates may "prop" fractures 16 such that fluids may flow more freely through the fractures 16.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

Example 1

Figure 3:
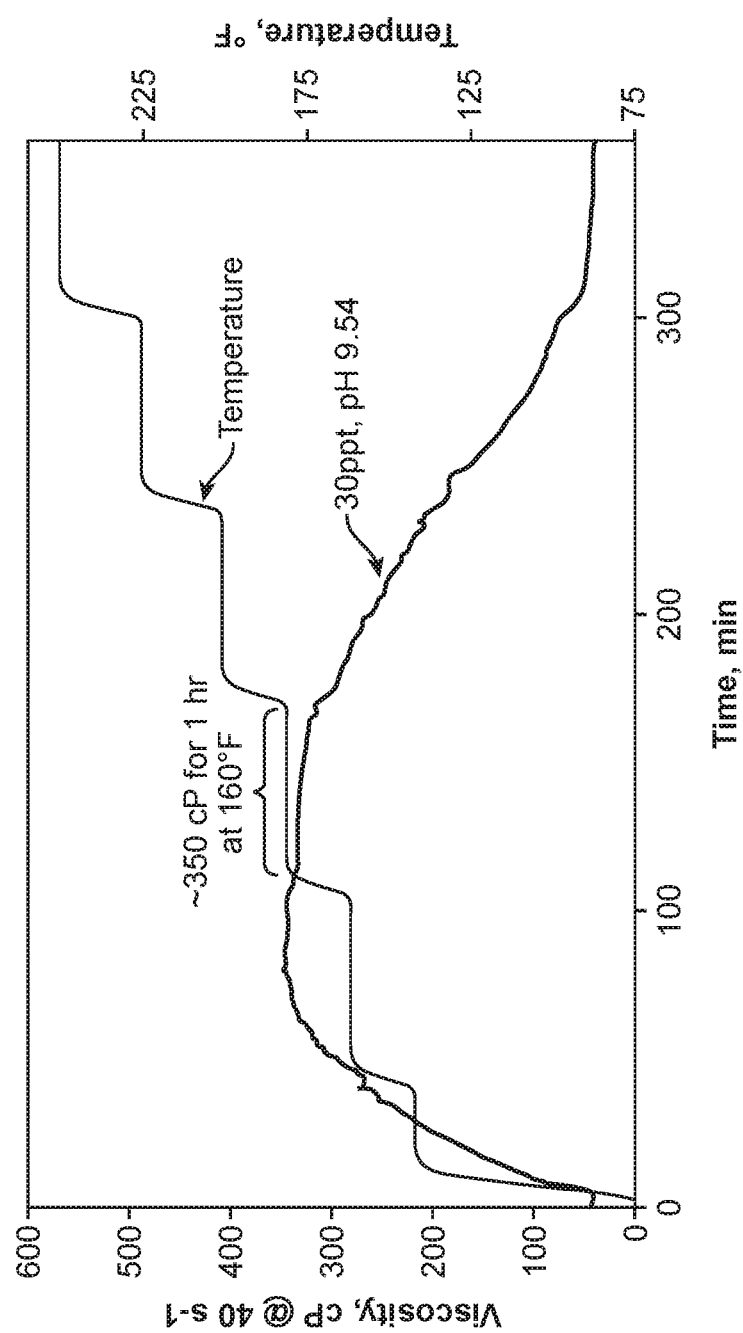
FIG. 3 is a graph showing the viscosity profile for an example fracturing fluid comprising a cationic quaternary ammonium hydroxyethyl cellulose (30 lb/1000 gal) crosslinked with titanium-triethanolamine (3 gal/1000 gal), measured using a Chandler model 5500 viscometer gradually while heating to 250° F.

3.6 grams of a cationic hydroxyethylcellulose (hydroxyethylcellulose functionalized with quaternary ammonium groups) was added to 1000 mL of tap water (resulting in a loading of 30 lb/1000 gal solution) and mixed at a rate of 1500 rpm for 30 minutes. Following hydration, a sufficient amount of a pH adjusting agent (in this case a potassium carbonate buffer) was added to achieve a pH of 9.5. 0.3 mL of CL-11™ (3 gal/1000 gal) and 0.15 mL of CL-18™ (1.5 gal/1000 gal) crosslinking agents were added to 100 mL of the hydrated cationic cellulose and blended at a shear rate of 1500 rpm for 30 seconds. As noted, the CL-11™ and CL-18™ cross-linking agents are titanium-triethanolamine crosslinkers. To determine the change in viscosity over time, 44 mL of crosslinked fluid was added to a couvette of the chandler 5550 viscometer, and the sample viscosity was monitored. FIG. 3 shows the viscosity profile data for the crosslinked fluid at various temperatures using various temperature ramps.

Example 2

Figure 4:
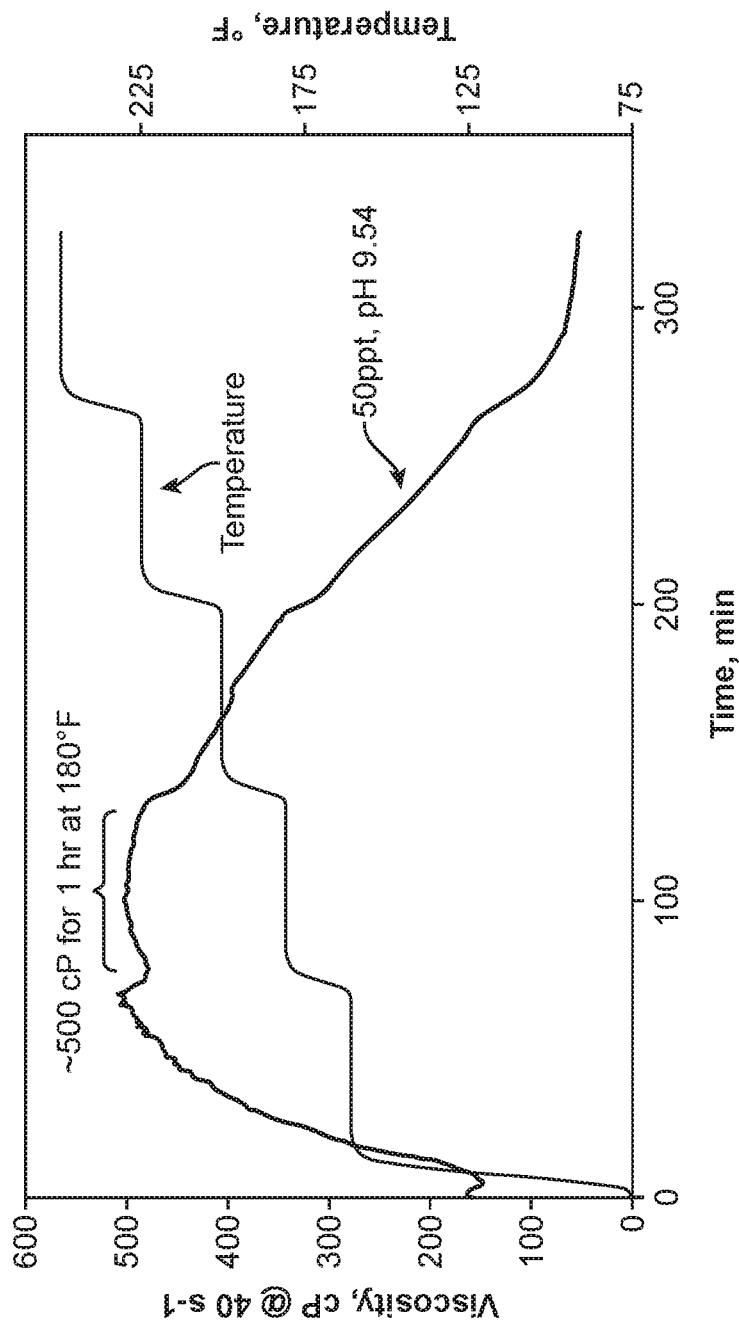
FIG. 4 is a graph showing the viscosity profile for a fracturing fluid comprising a cationic quaternary ammonium hydroxyethyl cellulose (50 lb/1000 gal) crosslinked with titanium-triethanolamine (3 gal/1000 gal), measured using a Chandler model 5500 viscometer gradually while heating to 250° F.

6 grams of a cationic hydroxyethylcellulose (hydroxyethylcellulose functionalized with quaternary ammonium groups) was added to 1000 mL of tap water (resulting in a loading of 50 lb/1000 gal solution) and mixed at a rate of 1500 rpm for 30 minutes. Following hydration, a pH adjusting agent (in this case a potassium carbonate buffer) was added to achieve a pH of 9.5. 0.3 mL of CL-11™ (3 gal/1000 gal) and 0.15 mL of CL-18™ (1.5 gal/1000 gal) crosslinking agents were added to 100 mL of the hydrated cationic cellulose, and blended at a shear rate of 1500 rpm for 30 seconds. To determine the change in viscosity over time, 44 mL of crosslinked fluid was added to a couvette of the chandler 5550 viscometer, and the sample viscosity was monitored. FIG. 4 shows the viscosity profile data for the crosslinked fluid at various temperatures using various temperature ramps.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. An aqueous fracturing fluid comprising:
   an aqueous base fluid;
   a hydroxyethylcellulose functionalized with quaternary ammonium groups and having a substitution level from 3.0 to 8.0 wt. % of the quaternary ammonium groups; and
   a metal crosslinking agent comprising titanium-triethanolamine,
   a pH adjusting agent sufficient to place a pH of the aqueous fracturing fluid in the range of at least 7.

2. The aqueous fracturing fluid of claim 1 comprising about 0.005 to about 10.0 wt. % of the hydroxyethylcellulose functionalized with quaternary ammonium groups.

3. The aqueous fracturing fluid of claim 1 comprising about 0.006 to about 2.0 wt. % of the hydroxyethylcellulose functionalized with quaternary ammonium groups.

4. The aqueous fracturing fluid of claim 1 comprising about 0.001 to about 5.0 wt. % of the crosslinking agent.

5. The aqueous fracturing fluid of claim 1 comprising about 0.005 to about 1.0 wt. % of the crosslinking agent.

6. The aqueous fracturing fluid of claim 1, further comprising a proppant.

7. The fracturing fluid of claim 6, further comprising a viscosity enhancing agent.

8. An aqueous fracturing fluid comprising:
   water;
   about 0.005 to about 10.0 wt % of hydroxyethylcellulose functionalized with quaternary ammonium groups and having a substitution level from 3.0 to 8.0 wt. % of the quaternary ammonium groups;
   about 0.001 to about 5 wt. % of a metal crosslinking agent comprising titanium-triethanolamine that reacts with the hydroxyl groups of the hydroxyethylcellulose functionalized with quaternary ammonium groups; and
   a proppant.

9. A method of forming fractures in a subterranean zone penetrated by a well bore, the method comprising
introducing an aqueous fracturing fluid comprising a hydroxyethylcellulose functionalized with quaternary ammonium groups and having a substitution level from 3.0 to 8.0 wt. % of the quaternary ammonium groups and a metal crosslinking agent comprising titanium-triethanolamine into the subterranean zone through the well bore under sufficient pressure to create fractures in the subterranean zone, and wherein the aqueous fracturing fluid has a pH of at least 7.

10. A method for enhancing the productivity of a hydrocarbon bearing formation penetrated by a well, the method comprising
pumping into the hydrocarbon-bearing formation an aqueous fracturing fluid comprising a hydroxyethylcellulose functionalized with quaternary ammonium groups and having a substitution level from 3.0 to 8.0 wt. % of the quaternary ammonium groups and a metal crosslinking agent comprising titanium-triethanolamine using one or more pumps, wherein the aqueous fracturing fluid has a pH of at least 7 and is pumped at a sufficient pressure to create one or more fractures.

11. A method for preparing an aqueous fracturing fluid comprising
a hydroxyethylcellulose functionalized with quaternary ammonium groups and having a substitution level from 3.0 to 8.0 wt. % of the quaternary ammonium groups, and a metal crosslinking agent comprising titanium-triethanolamine the method comprising:
a. hydrating the hydroxyethylcellulose functionalized with quaternary ammonium groups;
b. adjusting the pH of the hydrated hydroxyethylcellulose functionalized with quaternary ammonium by adding a pH adjusting agent, so that the pH is in the range of at least 7; and
c. adding the metal crosslinking agent to cross-link the hydroxyethylcellulose functionalized with quaternary ammonium groups.

12. The method of claim 11 further comprising mixing the fracturing fluid using mixing equipment.

* * * * *